Aug. 7, 1923.

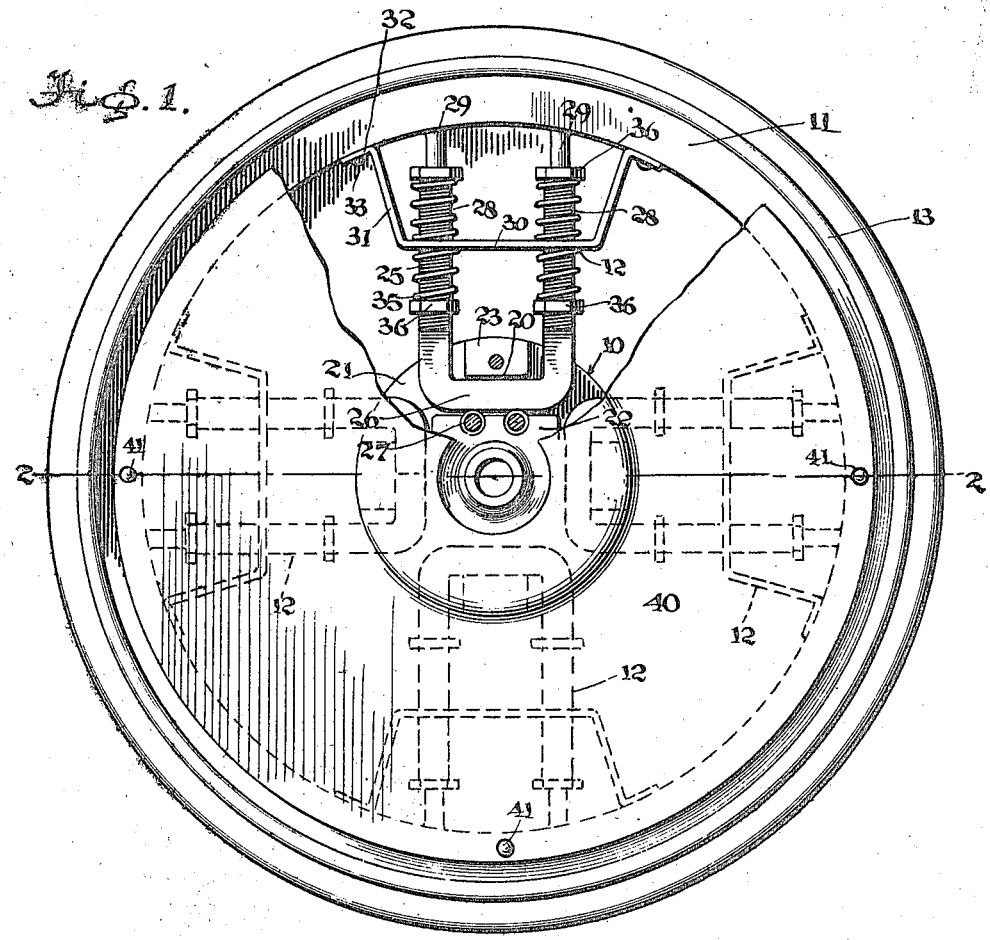

C. E. WIGGINS

RESILIENT WHEEL

Filed March 24, 1923     2 Sheets-Sheet 2

WITNESSES

INVENTOR
C. E. Wiggins,
BY
ATTORNEYS

Patented Aug. 7, 1923.

1,464,461

UNITED STATES PATENT OFFICE.

CLARENCE EMET WIGGINS, OF DELHI, LOUISIANA.

RESILIENT WHEEL.

Application filed March 24, 1923. Serial No. 627,388.

*To all whom it may concern:*

Be it known that I, CLARENCE E. WIGGINS, a citizen of the United States, and a resident of Delhi, in the parish of Richland and State of Louisiana, have invented certain new and useful Improvements in Resilient Wheels, of which the following is a specification.

This invention relates in general to resilient wheels, and the object of the invention is to provide a wheel of this character which is well adapted for use on automobiles as well as on other vehicles and wherein a high degree of resiliency is obtained so as to give the vehicle with which the wheel is used easy riding properties thereby enhancing the adaptability of the vehicle for use as a passenger vehicle and relieving the running gear and other parts of strains and shocks and rendering the employment of a pneumatic tire unnecessary, the tire or ground engaging element of the wheel at the same time being positively connected to the hub with respect to torsional forces so that a positive drive can be imparted through the wheel without deformation thereof.

Another object is to provide a device of this character which is of simple and durable construction, reliable in operation, adjustable so as to be adapted for various uses and easy and comparatively inexpensive to manufacture.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view in side elevation, showing the preferred embodiment of the invention, a portion of the cover plate being broken away for the sake of illustration;

Figure 2 is a view, partly in top plan, and partly in section, the section being taken on line 2—2 of Figure 1;

Figure 3:
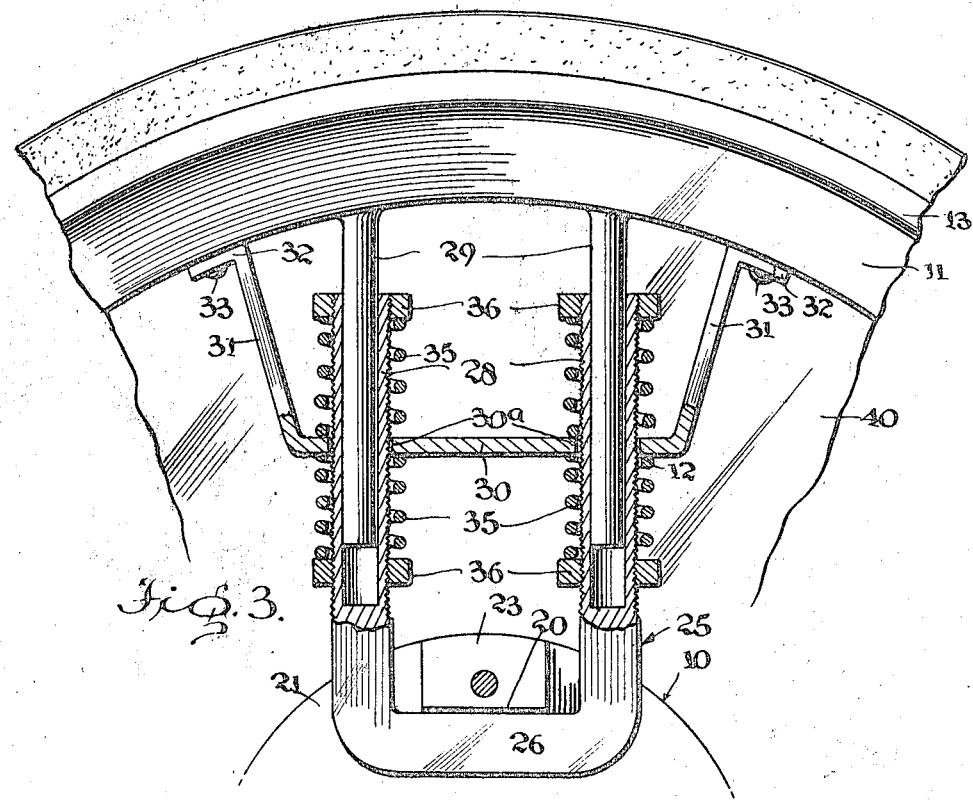
Figure 3 is a fragmentary view, partly in section and partly in elevation, showing the construction of the spring spoke arrangement, and, Figure 4 is a group view in perspective illustrating the parts of the hub prior to assembly.
Figure 4:
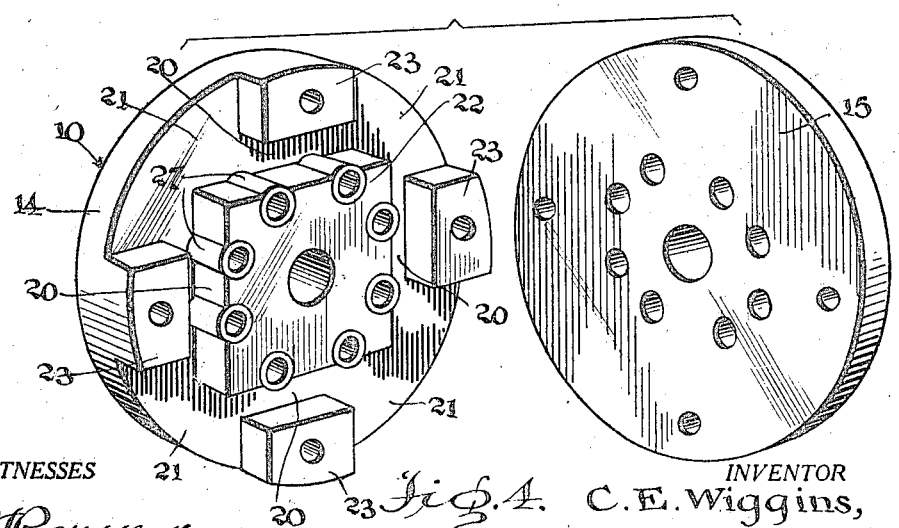

Referring to the drawings wherein for the sake of illustration is shown the preferred embodiment of the invention it will be seen that the wheel comprises in general a hub 10, a felly 11 and a number of spring devices 12 which function as spring spokes, these spring devices 12 being arranged between the hub and the felly and being hereinafter more fully described. Upon the felly 11 a tire 13 is mounted and usually comprises a metallic or solid tire as the use of a pneumatic tire is not necessary although of course a pneumatic tire may be utilized if desired. The hub 10 comprises a pair of plates 14 and 15 secured to each other by bolts and nuts 16 and having centrally disposed bearing portions 17 and 18 constituting the bearing for the axle. The plate 14 of the hub is heavier or thicker than the plate 15. This plate is provided with a plurality, preferably four, grooves 20 communicating at their ends with recesses or openings 21 whereby on the plate 14 there is defined a center block 22 and four lugs 23, one such lug being opposite each face of the block. The arrangement of the grooves and openings defining the center block and lugs 22 and 23 respectively are utilized for mounting the spring spoke arrangements 12 on the hub as will presently appear.

The spring spoke arrangements 12 are preferably four in number but as they are of identical construction a common description will serve for all. Each includes a U-shaped spoke member 25 having a body portion 26 slidably fitted in a groove 20. Each body portion preferably engages anti-friction rollers 27 conveniently mounted on the bolts 16 but if desired other anti-friction devices may be provided and may be mounted on the block 22 and also on the lugs 23. In the arrangement shown there is provided four grooves 20 and four spring devices 12 and one such body portion 26 is mounted in each groove 20. Integrally or rigidly formed with each body portion 26 is a pair of hollow legs 28 which extend parallel to each other and toward the felly. These hollow legs 28 have a smooth bore formed therein, and in each of these bores a guide post 29 is slidably fitted, the guide posts 29 being rigidly secured to the felly 11 at their outer ends.

A frame 30 is provided for each pair of hollow legs 28 and is arranged between the felly and the hub being secured to the felly by means of arms 31 having offset ends 32 secured by screws or other fastening means 33 to the felly. The body portion of the frame 30 is provided with suitable opening 30ª somewhat larger than the legs 28 and through which these legs extend. On each side of the frame 30 and on each leg 28 a spring 35 is mounted and thus there is provided two springs on each leg of each spoke member. Each spring engages the frame 30 at one end and at its opposite end it engages a nut 36 having threaded connection with the leg 28. With this arrangement, movement of the spoke members in either direction is resiliently resisted by at least two springs. Moreover the tension of each spring may be independently regulated by suitable adjustment of its nut 36.

In use, the wheel possesses a very high degree of resiliency for when it is subjected to load and is positioned as shown in Figure 1, the springs 35 which lie nearest the center of the wheel in the lower spring device 12 will be compressed while those which lie farthest from the center in the upper spring arrangement will be compressed so that four springs will resiliently take up the load. The spring arrangement lying on each side of the wheel readily accommodates any movement of the wheel necessary when riding over obstructions for the body portions 26 are freely movable within ample limits in the grooves 20. Of course when the felly of the wheel is moved upwardly as when the wheel engages an obstruction in the roadway the frames 30 must move upwardly and they do so against the action or resiliency of the springs which are not active in supporting the load. It is to be noted that the body portion is made sufficiently long to space the legs of the spoke members sufficiently far apart to give them the requisite clearance with respect to the lug 23. This resiliency is obtained without impairing the capacity of the wheel to provide a positive drive for it is to be noted that with respect to torsional forces the spoke members provide a positive and substantially rigid connection between the hub and the felly. At the same time radial movement between the hollow legs 28 and their guide posts 29 may at all times be partaken of by virtue of the fact that the body portions have limited sliding movement in the grooves 20, this sliding movement being in the plane of the wheel and at right angles to the axis thereof. The body portion of the spoke members also have a broad bearing on the lugs 23 and the block 22 or on the spaced anti-friction means when such are provided.

Preferably a pair of cover plates 40 are employed and are releasably secured to the felly by bolts and nuts 41. Centrally these cover plates are provided with openings of sufficient size to provide the necessary clearance between the inner peripheral edges of these plates and the hub whereby the wheel may partake of its movement without bringing these edges of the cover plates and the hub into engagement.

It is obvious from the foregoing that the guide posts 29 constitute means cooperable with the spring spokes for guiding the same or constraining the same to proper movements and also constitutes the means for positively transmitting the drive or torque from the hub to the felly or rim.

I claim:

1. A resilient wheel comprising a hub, a felly and a plurality of spring devices arranged between the hub and the felly and each including a U-shaped spoke member having a body portion movably mounted on the hub and having hollow legs, posts rigidly connected to the felly and slidably fitted in the hollow legs, a frame for each spoke member secured to the felly and having openings through which the hollow legs extend and a pair of springs mounted on each leg, each spring engaging the frame at one end, and an adjustable abutment mounted on the other end of each spring, the adjustable abutments being mounted on the legs.

2. A resilient wheel including a hub made up of a pair of plates secured together, one of the plates having a plurality of grooves and openings between the grooves, a felly and a plurality of spring spokes between the hub and the felly, each spring spoke including a U-shaped spoke member having a body portion mounted in the groove of the hub and having hollow legs, guide posts rigidly fixed to the felly and slidably fitted in the hollow legs, a frame for each spoke member secured to the felly and having openings through which the hollow legs extend, and springs coacting with the hollow legs and frame for resiliently resisting the movement of the spokes relatively of the frame.

3. A resilient wheel comprising a hub, a felly and a plurality of spring devices arranged between the hub and felly, each of said spring devices including a U-shaped spoke member having a body portion mounted on the hub for back and forth motion in a plane of the wheel and at right angles to the axis thereof, said spoke member including hollow legs, guide posts rigidly connected to the felly and slidably fitted in the hollow legs, a frame secured to the felly and having openings through which the hollow legs extend and yieldable means cooperating with the frame and with the hollow legs for resiliently resisting radial movement of said legs.

4. A resilient wheel including a hub, a felly and a plurality of spring devices arranged between the hub and the felly and each including a spoke member connected to the hub for limited movement with respect to the hub in the plane of the wheel and at right angles to the axis thereof, guide means rigidly connected to the felly and coacting with the spoke member for constraining the same to radial movement with respect to the felly, a frame for each spoke member secured to the felly and having an opening through which the spoke member extends, and yieldable means cooperable with the frame and with the spoke member for resiliently resisting radial movement of said spoke member.

5. A resilient wheel comprising a hub, a felly, and a plurality of spring devices arranged between the hub and the felly, each of said spring devices including a U-shaped spoke member having a body portion, the hub having a groove for each body portion, the body portion of each spoke member being fitted in its groove for sliding movement in the plane of the wheel and at right angles to the axis thereof, said spoke members also including hollow legs rigid with the body portion and extending parallel to each other and toward the felly, guide posts rigidly connected to the felly and slidably fitted in the hollow legs, a frame for each spoke member secured to the felly and having openings through which the hollow legs extend and a pair of coil springs mounted in encircling relation on each leg, each spring engaging the frame at one end and being connected to its hollow leg at its opposite end.

CLARENCE EMET WIGGINS.